United States Patent [19]

Jejelowo

[11] Patent Number: 5,466,649

[45] Date of Patent: Nov. 14, 1995

[54] POLYMERIZATION CATALYST SYSTEMS, THEIR PRODUCTION AND USE

[75] Inventor: Moses O. Jejelowo, Kingwood, Tex.

[73] Assignee: Exxon Chemical Patents Inc., Wilmington, Del.

[21] Appl. No.: 138,818

[22] Filed: Oct. 15, 1993

[51] Int. Cl.$^6$ .................. C08F 4/18; C08F 4/42
[52] U.S. Cl. .......... 502/120; 502/103; 502/117; 502/152; 526/129; 526/160
[58] Field of Search .................. 502/103, 117, 502/120, 152

[56] References Cited

U.S. PATENT DOCUMENTS

| | | | |
|---|---|---|---|
| 4,871,705 | 10/1989 | Hoel | 502/117 |
| 5,032,562 | 7/1991 | Lo et al. | 502/111 |
| 5,077,255 | 12/1991 | Welborn, Jr. | 502/104 |
| 5,122,491 | 6/1992 | Kioka et al. | 502/117 |
| 5,266,544 | 11/1993 | Tsutsui et al. | 502/113 |

Primary Examiner—Joseph L. Schofer
Assistant Examiner—David Wu
Attorney, Agent, or Firm—Jaimes Sher

[57] ABSTRACT

This invention is generally directed toward a catalyst system useful for polymerizing olefins. The catalyst system of this invention comprises a supported bulky ligand transition metal compound and a separately supported cocatalyst or activator for the compound.

25 Claims, No Drawings

POLYMERIZATION CATALYST SYSTEMS, THEIR PRODUCTION AND USE

FIELD OF THE INVENTION

This invention relates to catalysts, catalyst systems and to methods for their production and use in olefin polymerization. The invention particularly relates to a catalyst system of a supported bulky ligand transition metal compound and separately supported activator useful for the polymerization of olefins.

BACKGROUND OF THE INVENTION

A new catalyst technology has developed which provides for the modification and/or control over the properties and characteristics of a polymer. This technology principally involves the use of single-site catalysts to produce a broad range of polymers generally having a narrow molecular weight distribution and a narrow composition distribution. These catalysts are generally in the field of transition metal catalysis. The art has focused on the type of catalyst and catalyst system employed and methods for their manufacture and use in polymerization catalysis.

It is desirable in many polymerization processes, particularly a gas phase process, to use a supported catalyst. Generally these catalyst systems include a metallocene and alumoxane supported on the same carrier, such as silica, and subsequently dried to a powder. For example, U.S. Pat. No. 4,937,217 generally describes a mixture of trimethylaluminum and triethylaluminum added to an undehydrated silica then adding a metallocene to form a dry catalyst. EP-308177-B1 generally describes adding a wet monomer to a reactor containing a metallocene, trialkylaluminum and undehydrated silica. U.S. Pat. Nos. 4,912,075, 4,935,937 and 4,937,301 generally relate to adding trimethylaluminum to an undehydrated silica and then adding a metallocene to form a dry supported catalyst. Similarly, U.S. Pat. Nos. 5,008,228, 5,086,025 and 5,147,949 generally describe forming a dry supported catalyst by the addition of trimethylaluminum to a water impregnated silica then adding the metallocene. U.S. Pat. No. 4,914,253 describes adding trimethylaluminum to undehydrated silica, adding a metallocene and then drying the catalyst with an amount of hydrogen to produce a polyethylene wax. U.S. Pat. Nos. 4,808,561, 4,897,455 and 4,701,432 describe techniques to form a supported catalyst where the inert carrier, typically silica, is calcined and contacted with a metallocene(s) and a activator/cocatalyst component. U.S. Pat. No. 5,238,892 describes forming a dry supported catalyst by mixing a metallocene with an alkyl aluminum then adding undehydrated silica. U.S. Pat. No. 5,240,894 generally pertains to forming a supported metallocene/alumoxane catalyst system by forming a metallocene/alumoxane reaction solution, adding a porous carrier, evaporating the resulting slurry to remove residual solvent from the carrier. These references all concern the combination of a metallocene and alumoxane on one support or hydrolyzing an aluminum alkyl in situ on one support with a metallocene catalyst compound.

It would be highly desirable to have a polymerization catalyst system that could be modified easily without having to reformulate the entire catalyst system. Thus, a need exists in industry for an improved polymerization catalyst system and method for producing such a catalyst system.

SUMMARY OF THE INVENTION

This invention is generally directed towards a new polymerization catalyst system and to methods for its manufacture.

In one embodiment, the invention provides for a catalyst system comprising at least one first component comprising a majority of at least one supported bulky ligand transition metal compound and at least one second component comprising a majority of at least one supported cocatalyst or activator for said compound.

In another embodiment of the invention, there is provided a process for producing polyolefins by contacting olefin monomer, optionally with comonomer in the presence of the catalyst system described above.

In yet another embodiment of the invention, a method for producing the catalyst system described above is provided.

It is an object of the invention to provide a catalyst system with increased activity. It is a related object of the invention to provide a catalyst system capable of producing polymers with high molecular weights and lower melt indices. A further object of the invention is to provide a catalyst system that is easily adaptable to a gas phase process. Another object of the invention is to provide a catalyst system that is easily modified or tailored. Yet another object of the invention is to provide a simple catalyst system that is cost effective and efficient.

DETAILED DESCRIPTION OF THE INVENTION

Introduction

This invention is generally directed toward a supported catalyst system useful for polymerizing olefins. The method for forming the catalyst system of the invention provides for supporting a bulky ligand transition metal compound on a carrier and separately supporting a cocatalyst or activator for the bulky compound. The bulky ligand transition metal compound of the invention can be a metallocene. The metallocene catalyst systems of the invention have unexpectedly high activity as compared with most catalysts systems previously described where the metallocene and activator are on one carrier. The invention provides for the ability to manipulate the catalyst system easily by varying the quantities of the individually supported components of the invention. Until now previous catalyst system had to be reformulated from scratch, which is expensive and time consuming. Additionally it is now possible with catalyst systems of the invention to conveniently change the catalyst system, by adjusting the catalyst to activator ratio in a continuous polymerization process, particularly in gas phase process and to allow for quicker transitioning periods between polymer grades.

Catalyst Systems and Methods For Their Production

The catalyst is preferably a bulky ligand transition metal compound. The bulky ligand may contain a multiplicity of bonded atoms, preferably carbon atoms, forming a group which may be cyclic with one or more optional heteroatoms. The bulky ligand may be a cyclopentadienyl derivative which can be mono- or poly-nuclear. One or more bulky ligands may be bonded to the transition metal atom. The transition metal atom may be a Group IV, V or VI transition metal. Other ligands may be bonded to the transition metal, preferably detachable by a cocatalyst such as a hydrocarbyl or halogen leaving group. The catalyst is derivable from a compound of the formula

wherein L is the bulky ligand; X is the leaving group, M is the transition metal and m and n are such that the total ligand valency corresponds to the transition metal valency. Preferably the catalyst is four co-ordinate such that the compound is ionizable to a $1^+$ valency state.

The ligands L and X may be bridged to each other and if two ligands L and/or X are present, they may be bridged. The metallocenes may be full-sandwich compounds having two ligands L which are cyclopentadienyl groups or half-sandwich compounds having one ligand L only which is a cyclopentadienyl group.

For the purposes of this patent specification the term "metallocene" is defined to contain one or more cyclopentadienyl moiety in combination with a transition metal of the Periodic Table of Elements. In one embodiment the metallocene catalyst component is represented by the general formula $(C_p)_mMR_nR'_p$ wherein $C_p$ is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m= 1–3, n= 0–3, p= 0–3, and the sum of m+ n+ p equals the oxidation state of M. In another embodiment the metallocene catalyst component is represented by the formulas:

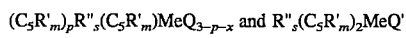

$(C_5R'_m)_pR''_s(C_5R'_m)MeQ_{3-p-x}$ and $R''_s(C_5R'_m)_2MeQ'$ wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or more of or a combination of a carbon, a germanium, a silicon, a phosphorous or a nitrogen atom containing radical substituting on and bridging two $(C_5R'_m)$ rings, or bridging one $(C_5R'_m)$ ring back to Me, when p= 0 and x= 1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

Various forms of the catalyst system of the metallocene type may be used in the polymerization process of this invention. Exemplary of the development of metallocene catalysts in the art for the polymerization of ethylene is the disclosure of U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and include alumoxane as the cocatalyst. None of these references disclose the catalyst system of this invention. There are a variety of methods for preparing alumoxane one of which is described in U.S. Pat. No. 4,665,208 incorporated herein by reference.

For the purposes of this patent specification, the terms "cocatalysts or activators" are used interchangeably and are defined to be any compound or component which can activate a bulky ligand transition metal compound. In one embodiment the activators generally contain a metal of Group II and III of the Periodic Table of Elements. In the preferred embodiment the bulky transition metal compound are metallocenes, which are activated by trialkylaluminum compounds, alumoxanes both linear and cyclic, or ionizing ionic activators or compounds such as tri(n-butyl)ammonium tetra(pentaflurophenyl)boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0520 732, EP-A-0 277 003 and EP-A-0 277 004 published Aug. 3, 1988, and U.S. Pat. Nos. 5,153,157, 5,198,401 and 5,241,025 are all herein fully incorporated by reference. Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International Publication WO 92/00333 published Jan. 9, 1992, U.S. Pat. Nos. 5,057, 475, 5,096,867, 5,055,438 and 5,227,440 and EP-A-0 420 436, WO 91/04257, all of which are fully incorporated herein by reference. In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference. All the catalyst systems of the invention may be, optionally, prepolymerized or used in conjunction with an additive or scavenging component to enhance catalytic productivity.

For purposes of this patent specification the term "carrier" or "support" can be any porous support such as talc, inorganic oxides, and resinous support materials such as polyolefin or polymeric compounds. Suitable inorganic oxide materials which are desirably employed include from the Periodic Table of Elements Groups II, III, IV or V metal oxides such as silica, alumina, silica-alumina, and mixtures thereof. Other inorganic oxides that may be employed either alone or in combination with the silica, alumina or silica-alumina are magnesia, titania, zirconia, and the like. Other suitable support materials can be employed such as, finely divided polyolefins, such as polyethylene or polymeric compounds. The specific particle size of the support or inorganic oxide, surface area, pore volume, and number of hydroxyl groups are not critical to its utility in the practice of this invention. However, such characteristics determine the amount of support to be employed in preparing the catalyst compositions, as well as affecting the properties of polymers formed. The characteristics of the carrier or support must therefore be taken into consideration in choosing the same for use in the particular invention. In one embodiment the carrier is surface modified with surface modifying agents as described in U.S. Pat. No. 5,124,418 incorporated herein by reference.

The catalyst system of this invention can be made in various ways. In one embodiment, a bulky ligand transition metal compound, such as a metallocene as described above, is contacted with a first carrier to form a first component, and independently, a cocatalyst or activator, such as an alumoxane or ionic activator, is contacted with a second carrier to form a second component. The first and second components can be used in slurry form or dried or any combination thereof.

The first component of the catalyst system of the invention comprises a majority of a carrier and a bulky ligand transition metal compound. The bulky ligand transition metal compound is generally in the range of 0.01 to about 50 weight percent of the total weight of the first component, preferably, 0.1 to about 25 weight percent, more preferably 0.3 to 10 weight percent and most preferably 0.5 to about 5 weight percent.

The second component of the catalyst system of the invention comprises a majority of a carrier and a cocatalyst or activator. The cocatalyst or activator is generally in the range of 1 to about 75 weight percent of the total weight of the second component, preferably, 1 to about 50 weight percent, more preferably 1 to about 25 weight percent, and most preferably 1 to about 15 weight percent.

The carriers of the invention can be the same or different or mixtures thereof. In the preferred embodiment the carrier in both components is the same type, and is preferably silica.

In another embodiment, two or more metallocenes can be used to form the first component or more than one first component is used and a similar or different activator can be used on one second component or more than one second component containing one or more activator can be used in the invention, or any combination thereof. In still yet another embodiment, the first and second components are further supported together on another carrier, other than the carriers used to support the first and second components, or separately supported on different carriers or even different types of carriers.

In one embodiment of the invention the first component can contain a quantity of an activator such that the mole ratio of the transition metal of the bulky ligand transition metal compound to the metal of the activator is in the range of less than 0.2:1 to 1000:1, preferably, less than 0.5:1 to 500:1, more preferably 0.7:1 to 300:1 and most preferably less than 1:1 to 100:1.

In another embodiment the second component can contain a quantity of a bulky ligand transition metal compound such that the mole ratio of the metal of the activator to the transition metal of the bulky compound is in the range of less than 0.2:1 to 1000:1, preferably, less than 0.5:1 to 500:1, more preferably 0.7:1 to 300:1 and most preferably less than 1:1 to 100:1.

In another embodiment, the mole percent of the metal of the activator of the second component to the transition metal of the bulky ligand transition metal compound of the first component is in the range of 1000:1 to 50:1, preferably less than 500:1, more preferably 200:1, even more preferably 150:1 and most preferably 50:1 to 100:1.

In a preferred embodiment, the weight ratio of the first component to the second component is in the range of 20:1 to about 1:20, preferably 10:1 to 10:1, more preferably 5:1 to 1:5 and most preferably 2:1 to 1:2.

Polymerization Process

The catalyst system of this invention is particularly well suited for the polymerization of monomers and optionally comonomers in any polymerization or prepolymerization process, gas, slurry or solution phase; even a high pressure autoclave process can be utilized. In the preferred embodiment a gas phase process is utilized.

In the preferred embodiment, this invention is directed toward the gas phase polymerization or copolymerization reactions involving the polymerization or optionally prepolymerization of one or more of the alpha-olefin monomers having from 2 to 20 carbon atoms, preferably 2–12 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aldehyde monomers. Preferably a copolymer of ethylene or propylene is produced such that the amount of ethylene or propylene and comonomer is adjusted to produce a desired polymer product. Preferably the comonomer is an alpha-olefin having from 3 to 15 carbon atoms, preferably 4 to 12 carbon atoms and most preferably 4 to 10 carbon atoms. In another embodiment ethylene is polymerized with at least two comonomers to form a terpolymer and the like.

In one embodiment of the process of the invention, the olefin(s) are prepolymerized in the presence of the catalyst system of the invention prior to the main polymerization. The prepolymerization can be carried out batchwise or continuously in gas, solution or slurry phase including at elevated pressures. The prepolymerization can take place with any alpha-olefin monomer or combination and/or in the presence of any molecular weight controlling agent such as hydrogen. For details on prepolymerization see U.S. Pat. Nos. 4,923,833 and 4,921,825 and EP-B-0279 863, published Oct. 14, 1992 all of which are incorporated fully herein by reference.

Typically in a gas phase polymerization process a continuous cycle is employed where in one part of the cycle, of a reactor, a cycling gas stream, otherwise known as a recycle stream or fluidizing medium, is heated in the reactor by the heat of polymerization. This heat is removed in another part of the cycle by a cooling system external to the reactor.

Generally in a gas fluidized bed process for producing polymer from monomers a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and new or fresh monomer is added to replace the polymerized monomer.

The catalyst is introduced into the reactor via a catalyst feeder mechanism either continuously or intermittently as is known in the art. Usually the catalyst is contained in a vessel with a mechanism for controlling the quantity of catalyst to be injected into the reactor. Typically the catalyst is blown into the reactor with a gas such as nitrogen. Many times these systems have multiple catalyst feeders and injection points for introducing catalyst into a reactor.

The invention provides for a process for polymerization of olefins alone or in combination with one or more other olefins in a reactor, said process comprising polymerization in the presence of a catalyst system which is introduced into said reactor, said catalyst system comprising (a) at least one first component comprising at least one first carrier and at least one bulky ligand transition metal compound supported on said first carrier and (b) at least one second component comprising at least one second carrier and at least one cocatalyst or activator for said bulky ligand transition metal compound supported on said second carrier.

In one embodiment of the invention components (a) and (b) are introduced into the reactor simultaneously from the same or different catalyst feeder. In another embodiment components (a) and (b) are introduced into the reactor together or apart. In still yet another embodiment components (a) and (b) are introduced into the reactor mixed together.

It is also contemplated in an alternative embodiment that the first component could comprise a mixture of a bulky ligand transition metal compound and a traditional Ziegler-Natta catalyst compound, other non-bulky ligand transition metal compound, or non-metallocene compound. Thus, the same is true for the activator component of the invention which could include any activator for the traditional Ziegler-Natta catalyst or non-metallocene compound alone or in combination with those activators and catalysts previously described.

EXAMPLES

In order to provide a better understanding of the present invention including representative advantages and limitations thereof, the following examples are offered.

Example 1

Preparation of Silica-Supported $Cp_2ZrCl_2$ 10 g sample of Davison 948 silica dehydrated at 850° C. was suspended in 60 cm$^3$ hexane at 22° C. A solution of 0.331 g $Cp_2ZrCl_2$ in 20 cm$^3$ toluene was then added slowly. After 1 h, the solvent was removed under vacuum to give a free-flow supported metallocene.

Preparation of TMA-Treated Silica Support 400 g Davison 948 silica having Loss-On-Ignition (LOI) value of 11.14 wt-% was added slowly to 3380 cm$^3$ of 10 wt-% trimethyl aluminum solution in iso-pentane contained in a 5-liter flask at −75° C. The silica was added at a rate of about 1.1 g/min. After all the silica had been added the slurry was allowed to warm up to 22° C. and this was maintained for 1 h. Then the support material was dried to free-flowing powder.

Polymerization of Olefins 0.35 g sample of the TMA-treated silica described above was added into a catalyst holding tube as a bottom layer of treated silica, to this was added 0.2 g of the silica-supported $Cp_2ZrCl_2$ described above, then a second layer of 0.35 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with a $N_2$ pressure. A feed of 1-butene in ethylene was then admitted into the reactor at 85° C. The pressure in the reactor was held constant by continuously feeding 5 mol-% 1-butene in ethylene to compensate for any pressure change due to polymerization. After 0.5 h, the polymer formed was separated from the seed bed material and analyzed for resin molecular properties and the results are shown in Table 1.

Example 2

Preparation of Silica-Supported $Cp_2ZrMe_2$ 10 g sample of Davison 948 silica dehydrated to 850° C. was suspended in 60 cm$^3$ hexane at 22° C. A solution of 0.283 g $Cp_2ZrMe_2$ in 20 cm$^3$ toluene was then added slowly. After 1 h, the solvent was removed under vacuum to give a free-flow supported metallocene. 0.35 g sample of the TMA-treated silica described in Example 1 was added into a catalyst holding tube as a bottom layer of treated silica, to this was added 0.2 g of the silica-supported $Cp_2ZrMe_2$ described above, then a second layer of 0.35 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor that had been pretreated with 0.13 cm$^3$ of 24.7 wt-% triethylaluminum and tested for the polymerization of ethylene/1-butene as described in Example 1; the results are summarized in Table 1.

Example 3

Preparation of Silica-Supported $Cp_2HfCl_2$ 11.3 g sample of Davison 948 silica dehydrated to 850° C. was suspended in 60 cm$^3$ hexane at 22° C. A solution of 0.246 g $Cp_2HfCl_2$ in 20 cm$^3$ toluene was then added slowly. After 1 h, the solvent was removed under vacuum to give a free-flow supported metallocene. 1 g sample of this supported metallocene was mixed uniformly in a vial with 3 g sample of the TMA-treated silica described in Example 1. 0.9 g sample of this mixture was then admitted into a semi-batch gas-phase reactor with a $N_2$ pressure and tested for the polymerization of ethylene/1-butene as described in Example 1; the results are summarized in Table 1.

Example 4

Preparation of Silica-Supported $Cp_2HfCl_2$ 0.5 g sample of the supported metallocene described in Example 3 above was mixed uniformly in a vial with 2.5 g sample of the TMA-treated silica described in Example 1. 1 g sample of this mixture was then admitted into a semi-batch gas-phase reactor with a $N_2$ pressure and tested for the polymerization of ethylene/1-butene as described in Example 1; the results are summarized in Table 1.

Example 5

Preparation of Silica-Supported $(^nPrCp)_2ZrCl_2$ 10 g sample of Davison 948 silica dehydrated to 850° C. was suspended in 60 cm$^3$ hexane at 22° C. A solution of 0.43 g $(^nPrCp_2ZrCl_2$ in 20 cm$^3$ toluene was then added slowly. After 1 h, the solvent was removed under vacuum to give a free-flow supported metallocene.

0.35 g sample of the TMA-treated silica described in Example 1 was added into a catalyst holding tube as a bottom layer of treated silica, to this was added 0.1 g of the silica-supported $(^nPrCp_2ZrCl_2)$ described above, then a second layer of 0.35 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1; the results are summarized in Table 1.

Example 6

0.25 g sample of the TMA-treated silica described in Example 1 was added into a catalyst holding tube as a bottom layer of treated silica, to this was added 0.04 g of the silica-supported $(^nPrCp)_2ZrCl_2$ described in Example 5 above, then a second layer of 0.25 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1; the results are summarized in Table 1.

Example 7

1 g sample of the supported metallocene described in Example 5 above was mixed uniformly in a vial with 2 g sample of the TMA-treated silica described in Example 1. 0.24 g sample of this mixture was then admitted into a semi-batch gas-phase reactor with a $N_2$ pressure and tested for the polymerization of ethylene/1-butene as described in Example 1; the results are summarized in Table 1.

Example 8

0.32 g sample of Davison 948 silica dehydrated to 850° C. was added into a catalyst holding tube as a bottom layer of silica, to this was added 0.16 g of the silica-supported ($^n$PrCp)$_2$ZrCl$_2$ described in Example 5 above, then a second layer of Davison 948 silica dehydrated to 850° C. was added as a top layer such that the silica-supported metallocene was sandwiched between two layers of the 850° C.-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1. Subsequently, 0.7 g of the TMA-treated silica described in Example 1 was added into the reactor; the results are summarized in Table 1.

Example 9 (Comparative)

Preparation of supported ($^n$PrCp)$_2$ZrCl$_2$ 1200 cm$^3$ of a 30 wt-% MAO solution in toluene was added to 680 g of Davison 948 silica dried to 200° C. in a 2-gal reactor. Then 2000 cm$^3$ toluene was added. The temperature was raised to 70° C. and maintained for 4 h. Then a toluene solution of 16.5 g ($^n$PrCp)$_2$ZrCl$_2$ was added slowly followed by a 2 h hold of the reaction conditions. The resultant catalyst was dried to free-flowing powder under reduced pressure. This catalyst had Al/Zr molar ratio of 130 and Zr loading of 0.4 wt-%. A sample of this catalyst was tested for ethylene/1-butene copolymerization as described in Example 1. The reactor was pretreated with 0.15 cm$^3$ of 24.7 wt-% TEAL in heptane. The results are summarized in Table 1.

Example 10

Preparation of Silica-Supported ($^i$PrCp)$_2$ZrCl$_2$ 10 g sample of Davison 948 silica dehydrated to 850° C. was suspended in 60 cm$^3$ hexane at 22° C. A solution of 0.43 g ($^i$PrCp)$_2$ZrCl$_2$ in 20 cm$^3$ toluene was then added slowly. After 1 h, the solvent was removed under vacuum to give a free-flow supported metallocene.

0.36 g sample of the TMA-treated silica described in Example 1 was added into a catalyst holding tube as a bottom layer of treated silica, to this was added 0.15 g of the silica-supported ($^i$PrCp)$_2$ZrCl$_2$ described above, then a second layer of 0.36 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1; the results are summarized in Table 1.

Example 11 (Comparative)

Preparation of supported ($^i$PrCp)$_2$ZrCl$_2$ 1415 cm$^3$ of a 30 wt-% MAO solution in toluene was added to 800 g of Davison 948 silica dried to 200° C. in a 2-gal reactor. Then 2000 cm$^3$ toluene was added. The temperature was raised to 70° C. and maintained for 4 h. Then a toluene solution of 21.7 g ($^i$PrCp)$_2$ZrCl$_2$ was added slowly followed by a 2 h hold of the reaction conditions. The resultant catalyst was dried to free-flowing powder under reduced pressure. This catalyst had Al/Zr molar ratio of 110 and Zr loading of 0.44 wt-%. A sample of this catalyst was tested for ethylene/1-butene copolymerization as described in Example 1. The reactor was pretreated with 0.15 cm$^3$ of 24.7 wt-% TEAL in heptane. The results are summarized in Table 1.

Example 12

Preparation of Silica-Supported (1,3-MeEtCp)$_2$ZrCl$_2$ 10 g sample of Davison 948 silica dehydrated to 850° C. was suspended in 60 cm$^3$ hexane at 22° C. A solution of 0.43 g (1,3-MeEtCp)$_2$ZrCl$_2$ in 20 cm$^3$ toluene was then added slowly. After 1 h, the solvent was removed under vacuum to give a free-flow supported metallocene.

0.35 g sample of the TMA-treated silica described in Example 1 was added into a catalyst holding tube as a bottom layer of treated silica, to this was added 0.12 g of the silica-supported (1,3-MeEtCp)$_2$ZrCl$_2$ described above, then a second layer of 0.35 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1; the results are summarized in Table 1.

Example 13 (Comparative)

Preparation of supported (1,3-MeEtCp)$_2$ZrCl$_2$ 52.3 g of Davison 948 silica dried to 200° C. was slurried in 300 cm$^3$ heptane in a reaction flask. The flask was cooled to 0° C. and 105 cm$^3$ of 30 wt-% methylalumoxane in toluene was added. After 0.5 h, the temperature was raised to 70° C. and maintained for 3 h. Then a toluene solution of 1.521 g (1,3-MeEtCp)$_2$ZrCl$_2$ as prepared above was added slowly followed by a 1 h hold of the reaction conditions. Then the resultant catalyst was dried to free-flowing powder under reduced pressure. This catalyst had Al/Zr molar ratio of 120 and Zr loading of 0.45 wt-%. A sample of this catalyst was tested for ethylene/1-butene co-polymerization as described in Example 1. The reactor was pretreated with 0.2 cm$^3$ of 24.7 wt-% TEAL in heptane. The results are summarized in Table 1.

Example 14

Preparation of Silica-Supported (1,3-Me$^n$BuCp)$_2$ZrCl$_2$ 10.5 g sample of Davison 948 silica dehydrated to 850° C. was suspended in 100 cm$^3$ hexane at 22° C. A solution of 0.203 g (1,3-Me$^n$BuCp)$_2$ZrCl$_2$ in 20 cm$^3$ toluene was then added slowly. After 1 h, the solvent was removed under vacuum to give a free-flow supported metallocene.

0.3 g sample of the TMA-treated silica described in Example 1 was added into a catalyst holding tube as a bottom layer of treated silica, to this was added 0.2 g of the silica-supported (1,3-Me$^n$BuCp)$_2$ZrCl$_2$ described above, then a second layer of 0.3 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1. The reactor was pretreated with 0.2 cm$^3$ of 24.7 wt-% TEAL in heptane. The results are summarized in Table 1.

Example 15

Preparation of Silica-Supported $(1,3\text{-Me}^n\text{BuCp})_2\text{ZrCl}_2$ 10 g sample of Davison 948 silica dehydrated to 850° C. was suspended in 60 cm$^3$ hexanes at 22° C. A solution of 0.497 g $(1,3\text{-Me}^n\text{BuCp})_2\text{ZrCl}_2$ in 20 cm$^3$ toluene was then added slowly. After 1 h, the solvent was removed under vacuum to give a free-flow supported metallocene.

0.35 g sample of the TMA-treated silica described in Example 1 was added into a catalyst holding tube as a bottom layer of treated silica, to this was added 0.125 g of the silica-supported $(1,3\text{-Me}^n\text{BuCp})_2\text{ZrCl}_2$ described above, then a second layer of 0.35 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1; the results are summarized in Table 1.

Example 16 (Comparative)

Preparation of supported $(1,3\text{-Me}^n\text{BuCp})_2\text{ZrCl}_2$ 20.6 g of Davison 948 silica dried to 200° C. was slurried in 110 cm$^3$ toluene in a reaction flask. The flask was cooled to 0° C. and 36.5 cm$^3$ of 30 wt-% methylalumoxane in toluene was added. After 1 h, the temperature was raised to 70° C. and maintained for 4 h. Then a toluene solution of 0.742 g $(1,3\text{-Me}^n\text{BuCp})_2\text{ZrCl}_2$ as prepared above was added slowly followed by a 2 h hold of the reaction conditions. Then the resultant catalyst was dried to free-flowing powder under reduced pressure. This catalyst had Al/Zr molar ratio of 100 and Zr loading of 0.5 wt-%. A sample of this catalyst was tested for ethylene/1-butene co-polymerization as described in Example 1. The reactor was pretreated with 0.2 cm$^3$ of 24.7 wt-% TEAL in heptane. The results are summarized in Table 1.

Example 17

Preparation of Silica-Supported $\text{Me}_2\text{Si(THI)}_2\text{ZrCl}_2$ 10 g sample of Davison 948 silica dehydrated to 850° C. was suspended in 60 cm$^3$ hexanes at 22° C. A solution of 0.43 g $\text{Me}_2\text{Si(THI)}_2\text{ZrCl}_2$ racemic dimethyl-1-silanylene bridged bis-(tetrahydroindenyl) zirconium dichloride in 20 cm$^3$ toluene was then added slowly. After 1 h, the solvent was removed under vacuum to give a free-flow supported metallocene.

0.35 g sample of the TMA-treated silica described in Example 1 was added into a catalyst holding tube as a bottom layer of treated silica, to this was added 0.12 g of the silica-supported $\text{Me}_2\text{Si(THI)}_2\text{ZrCl}_2$ described above, then a second layer of 0.35 g of the TMA-treated silica was added as a top layer such that the silica-supported metallocene was sandwiched between two layers of the TMA-treated silica. This catalyst holding tube was, meanwhile, clamped in place such that no shaking took place. This catalyst setup was then admitted into a semi-batch gas-phase reactor with $N_2$ and tested for the polymerization of ethylene/1-butene as described in Example 1; the results are summarized in Table 1.

While the present invention has been described and illustrated by reference to particular embodiments thereof, it will be appreciated by those of ordinary skill in the art that the invention lends itself to variations not necessarily illustrated herein. For example, it is not beyond the scope of this invention to use the polymerization catalyst of the invention in two or more reactors or to control a polymerization process by manipulating the components of catalyst system of the invention. For this reason, then, references should be made solely to the appended claims for purposes of determining the true scope of the present invention.

TABLE 1

| Example | Run Length (min) | Monomer Pressure (psi) | Yield (g) | Normalized Catalyst Efficiency[1] | $I_{2.1}$ (dg/min) | $I_{21}$ (dg/min) | Density (g/cc) | Mw | Comments |
| --- | --- | --- | --- | --- | --- | --- | --- | --- | --- |
| 1 | 30 | 96 | 52 | 813 | 6.77 | 180.1 | 0.9361 | 61500 | $\text{Cp}_2\text{ZrCl}_2$ |
| 2 | 60 | 146 | 149 | 745 | 1.93 | 44.8 | 0.9238 | 83270 | $\text{Cp}_2\text{ZrMe}_2$ |
| 3 | 60 | 183 | 25 | 91 | — | 2.0 | 0.9321 | 198400 | $\text{Cp}_2\text{HfCl}_2$ |
| 4 | 60 | 198 | 38 | 180 | — | 2.0 | 0.9288 | 206900 | " |
| 5 | 30 | 76 | 147 | 5826 | 4.26 | 78.0 | 0.9158 | 69260 | $(^n\text{PrCp})_2\text{ZrCl}_2$ |
| 6 | 30 | 96 | 78 | 6094 | 2.02 | 37.6 | 0.9210 | 83840 | " |
| 7 | 60 | 134 | 296 | 4142 | 6.31 | 114.8 | 0.9156 | 56500 | " |
| 8 | 15 | 120 | 21 | 656 | — | 4.1 | 0.9292 | 151900 | " |
| C 9 | 30 | 42 | 41 | 2929 | 5.30 | 123.6 | 0.9465 | 61470 | " |
| 10 | 60 | 149 | 18 | 121 | — | 1.9 | 0.9491 | 220300 | $(^i\text{PrCp})_2\text{ZrCl}_2$ |
| C 11 | 30 | 139 | 49 | 353 | 0.46 | 15.7 | 0.9376 | 112450 | " |
| 12 | 60 | 146 | 62 | 531 | — | 0.9 | 0.9233 | 216200 | $(1,3\text{-MeEtCp})_2\text{ZrCl}_2$ |
| C 13 | 60 | 100 | 88 | 660 | 0.31 | 16.0 | 0.9197 | 148200 | " |
| 14 | 30 | 126 | 113 | 2152 | 0.33 | 11.1 | 0.9299 | 111760 | $(1,3\text{-Me}^n\text{BuCp})_2\text{ZrCl}_2$ |
| 15 | 60 | 151 | 40 | 199 | — | 3.9 | 0.9306 | 155400 | " |
| C 16 | 30 | 137 | 156 | 1708 | 1.27 | 24.6 | 0.9150 | 94100 | " |
| 17 | 60 | 136 | 118 | 813 | 0.84 | 47.3 | 0.9209 | 90600 | $\text{Me}_2\text{Si(THI)}_2\text{ZrCl}_2$ |

[1] $g_{PE}/(g_{CAT} \cdot h \cdot 150\ psi)$

What is claimed is:

1. A catalyst system comprising:

a) at least one first component consisting essentially of a majority of at least one supported metallocene; and separately b) at least one second component consisting essentially of a majority of at least one supported cocatalyst or activator for said metallocene.

2. The catalyst system of claim 1 wherein said cocatalyst or activator is at least one of an alumoxane or an ionic activator or combination thereof.

3. The catalyst system of claim 1 wherein said first and second components are supported on a carrier selected from the group consisting of inorganic oxides, polymeric compounds and mixtures thereof.

4. The catalyst system of claim 1 wherein no less than about 75 weight percent of all the metallocene within the catalyst system resides on the first component.

5. The catalyst system of claim 1 wherein said metallocene is represented by the general formula $(Cp)_mMR_nR'_p$ wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m= 1–3, n= 0–3, p= 0–3, and the sum of m+ n+ p equals the oxidation state of M.

6. The catalyst system of claim 1 wherein said metallocene compound is represented by the general formulas:

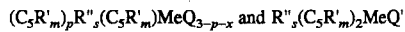

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or a combination of a carbon, a germanium, a silicon, a phosphorous or a nitrogen atom containing radical substituting on and bridging two ($C_5R'_m$) rings, or bridging one ($C_5R'_m$) ring to Me, when p= 0 and x= 1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

7. The catalyst system of claim 3 wherein said carrier is silica, alumina or combinations thereof.

8. A catalyst system consisting essentially of:
a) at least one first component comprising at least one first carrier and at least one metallocene; and separately
b) at least one second component comprising at least one second carrier and at least one activator for said metallocene; wherein said first component is free of an activator.

9. The catalyst system of claim 8 wherein the weight percent of said metallocene in said first component is in the range of from 1 to 10 weight percent based on the total weight of the first component.

10. The catalyst system of claim 8 wherein the weight percent of the activator is in the range of 1 to 15 weight percent based on the total weight of the second component.

11. The catalyst system of claim 8 wherein the mole ratio of the transition metal of the metallocene of the first component to the activator of the second component is about 1:50.

12. The catalyst system of claim 8 wherein said carrier is an inorganic oxide or polymeric compound or a mixture thereof.

13. The catalyst system of claim 8 wherein said activator is at least one of an alumoxane or an ionic activator or combination thereof.

14. The catalyst system of claim 8 wherein said bulky ligand transition metal compound is represented by the general formula $(C_p)_mMR_nR'_p$ wherein $C_p$ is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m= 1–3, n= 0–3, p= 0–3, and the sum of m+ n+ p equals the oxidation state of M.

15. The catalyst system of claim 8 wherein said metallocene is represented by the general formulas:

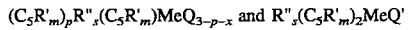

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or a combination of a carbon, a germanium, a silicon, a phosphorous or a nitrogen atom containing radical substituting on and bridging two ($C_5R'_m$) rings, or bridging one ($C_5R'_m$) ring to Me, when p= 0 and x= 1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

16. A catalyst system comprising:
a) at least one first component consisting essentially of at least one first carrier and at least one metallocene; and separately
b) at least one second component comprising at least one second carrier and at least one cocatalyst or activator for said metallocene; wherein said second component is free of a metallocene.

17. A catalyst system comprising:
a) at least one first component comprising at least one first carrier and at least one metallocene; and separately
b) at least one second component consisting essentially of at least one second carrier and at least one cocatalyst or activator for said metallocene; wherein said first component is free of an activator for said metallocene.

18. A catalyst system comprising:
a) at least one first component consisting essentially of at least one first carrier and at least one metallocene; and
b) at least one second component consisting essentially of at least one second carrier and at least one cocatalyst or activator for said metallocene.

19. A catalyst system comprising:
a) a catalyst component consisting of at least one first carrier and at least one metallocene;
b) an activator component consisting of at least one second carrier and at least one cocatalyst or activator for said metallocene.

20. The catalyst system of claim 19 wherein said first and second carrier is a polymeric compound or inorganic oxide or combination thereof.

21. The catalyst system of claim 19 wherein said metallocene is represented by the general formulas:

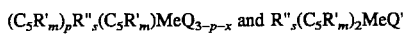

wherein Me is a Group 4, 5, 6 transition metal, $C_5R'_m$ is a substituted cyclopentadienyl, each R', which can be the same or different is hydrogen, alkenyl, aryl, alkylaryl or arylalkyl radical having from 1 to 20 carbon atoms or two carbon atoms joined together to form a part of a $C_4$ to $C_6$ ring, R" is one or a combination of a carbon, a germanium, a silicon, a phosphorous or a nitrogen atom containing radical substituting on and bridging two $(C_5R'_m)$ rings, or bridging one $(C_5R'_m)$ ring to Me, when p= 0 and x= 1 otherwise "x" is always equal to 0, each Q which can be the same or different is an aryl, alkyl, alkenyl, alkylaryl, or arylalkyl radical having from 1 to 20 carbon atoms or halogen, Q' is an alkylidene radical having from 1–20 carbon atoms, s is 0 or 1 and when s is 0, m is 5 and p is 0, 1 or 2 and when s is 1, m is 4 and p is 1.

22. A catalyst system comprising:
   a) at least one catalyst consisting essentially of at least one first carrier and at least one metallocene; and
   b) at least one activator for said metallocene comprising at least one second carrier and at least one cocatalyst or activator.

23. The catalyst system of claim 22 wherein said catalyst system further comprises a supported or unsupported metallocene/alumoxane or metallocene/ionic activator catalyst system or combination thereof.

24. The catalyst system of claim 22 wherein said catalyst system further comprises a scavenger or an additional activator.

25. A catalyst system comprising a supported metallocene free of an activator and a separately supported activator free of a metallocene.

* * * * *